(12) United States Patent
Chaganti et al.

(10) Patent No.: US 10,847,050 B2
(45) Date of Patent: Nov. 24, 2020

(54) DATABASE AND SYSTEM ARCHITECTURE FOR TASK ASSIGNMENT AND INCENTIVE TRACKING

(71) Applicant: MASTERCARD INTERNATIONAL INCORPORATED, Purchase, NY (US)

(72) Inventors: Sai Sudha Venkata Chaganti, Ballwin, MO (US); Emily Marie Thompson, St. Peters, MO (US); Alvaro Lima, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 322 days.

(21) Appl. No.: 15/843,246

(22) Filed: Dec. 15, 2017

(65) Prior Publication Data

US 2019/0189024 A1 Jun. 20, 2019

(51) Int. Cl.
*G06Q 10/00* (2012.01)
*G09B 19/00* (2006.01)
*G06F 16/248* (2019.01)
*G06F 16/23* (2019.01)
*G06Q 10/06* (2012.01)

(52) U.S. Cl.
CPC ....... *G09B 19/003* (2013.01); *G06F 16/2365* (2019.01); *G06F 16/248* (2019.01); *G06Q 10/00* (2013.01); *G06Q 10/06311* (2013.01); *G06Q 10/06398* (2013.01)

(58) Field of Classification Search
CPC . G09B 19/003; G06F 16/2365; G06F 16/248; G06Q 10/00; G06Q 10/06311; G06Q 10/06398
USPC ............................................. 434/238; 34/238
See application file for complete search history.

(56) References Cited

U.S. PATENT DOCUMENTS

| | | | |
|---|---|---|---|
| 8,285,195 B2 | 10/2012 | Etuk et al. | |
| 2014/0129275 A1 | 5/2014 | Jones et al. | |
| 2014/0297348 A1 | 10/2014 | Ellis | |
| 2015/0243175 A1 | 8/2015 | Raman et al. | |
| 2015/0286980 A1* | 10/2015 | Shusterman | G06Q 10/063114 705/7.15 |
| 2016/0378549 A1 | 12/2016 | Irish | |

* cited by examiner

*Primary Examiner* — Robert P Bullington
(74) *Attorney, Agent, or Firm* — Armstrong Teasdale LLP

(57) ABSTRACT

In one aspect, a task management computing device is provided, including a processor in communication a memory and a database. The task management computing device is configured to receive a task request including a task description and a virtual point value, and store a task record in the database based on the task request. The task management computing device is further configured to receive a task update indicating the task has been completed, and update a household member profile stored in the database based on the task update including increasing a virtual point balance. The task management computing device is also configured to update the associated task record based on the task update, and store the updated household member profile and the updated task record in the database.

21 Claims, 7 Drawing Sheets

DATABASE AND SYSTEM ARCHITECTURE FOR TASK ASSIGNMENT AND INCENTIVE TRACKING

BACKGROUND

The field of the present disclosure relates generally to tracking assigned tasks and associated incentives, and in particular, to a database and system architecture for task assignment and incentive tracking.

Household management requires coordination of a multitude of specific or repeating tasks among a plurality of household members. For example, assigning household tasks to children may be time consuming, due to the need for repeated reminders and instruction. In at least some known systems, heads of households (e.g., parents) may manually manage task assignment among household members such as children, including directly communicating tasks, incentives and reminders.

Additionally, household heads may utilize task incentives to increase efficiency and productivity. However, known systems for household task management require manually assigning and tracking incentives associated with tasks. For example, determining when rewards have been earned and tracking progress. Additionally, the effectiveness of task incentives for household members depends at least in part on the relevance of the task incentive, which places an additional burden on household heads to research and judge the relevance of available incentives.

Often, heads of households are also payment cardholders, and may accrue reward points based on payment card transactions. For example, reward points may accrue based on dollars charged. Reward points may offer an opportunity to decrease costs associated with task incentives, but again require manual management and tracking to be utilized, such as matching incentives relevant to household members with products available using reward points, and determining when sufficient reward points have been accrued.

BRIEF DESCRIPTION

In one aspect, a task management (TM) computing device is provided, including a processor in communication with a memory and a database. The task management computing device is configured to receive a task request including a task description and a virtual point value, and store a task record in the database based on the task request. The task management computing device is further configured to receive a task update indicating the task has been completed, and update a household member profile stored in the database based on the task update including increasing a virtual point balance. The task management computing device is also configured to update the associated task record based on the task update, and store the updated household member profile and the updated task record in the database.

In another aspect, a computer-implemented method of task assignment and incentive tracking using a TM computing device is provided. The method includes receiving a task request including a task description and a virtual point value, and storing a task record in a database based on the task request. The method further includes receiving a task update indicating the task has been completed, and updating a household member profile stored in the database based on the task update including increasing a virtual point balance. The method also includes updating the associated task record based on the task update, and storing the updated household member profile and the updated task record in the database.

In yet another aspect, a computer-readable storage media having computer-executable instructions embodied thereon for task assignment and incentive tracking is provided. When executed by a processor in communication with a memory, the computer-executable instructions cause the processor to receive a task request including a task description and a virtual point value, and store a task record in the database based on the task request. The computer-readable instructions further cause the processor to receive a task update indicating the task has been completed, and update a household member profile stored in the database based on the task update including increasing a virtual point balance. The computer-readable instructions also cause the processor to update the associated task record based on the task update, and store the updated household member profile and the updated task record in the database.

BRIEF DESCRIPTION OF THE DRAWINGS

FIG. 1 is a simplified block diagram of an example computer system used for task assignment and incentive tracking.

FIG. 2 illustrates a message flowchart of an example implementation of the system shown in FIG. 1.

FIG. 3 illustrates a message flowchart of an example implementation of the system shown in FIG. 1.

FIG. 4 illustrates an example configuration of a user computer device that may be used with the system shown in FIG. 1.

FIG. 5 illustrates an example configuration of a server computer device that may be used with the system shown in FIG. 1.

FIG. 6 is a flowchart illustrating an example process of the system shown in FIG. 1.

FIG. 7 illustrates an example configuration of a database that may be used with the system shown in FIG. 1.

DETAILED DESCRIPTION

Figure 1:
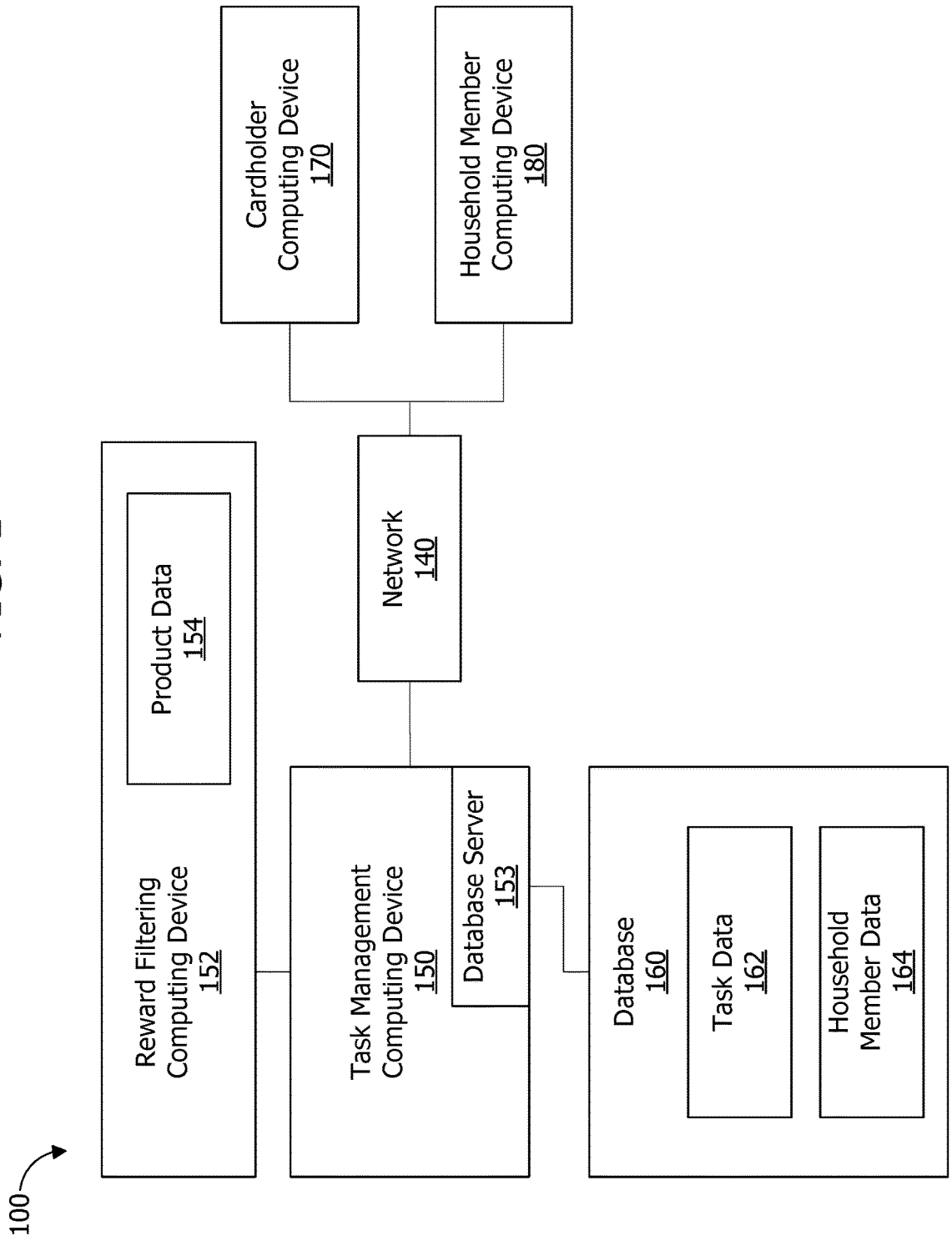
FIGS. 1-7 show example embodiments of the methods and system described herein.

The disclosure describes a database and system architecture that are directed to task assignment and incentive management, and more specifically, a system, method, and database architecture for managing task assignments and associated incentives.

In one aspect, a task management (TM) computing device is provided. The TM computing device includes a database server in communication with a database for storing task data and household member data. Holders of payment cards may accrue reward points based on payment card transactions. For example, reward points may accrue based on dollars charged to a payment card used by a cardholder. Some cardholders are additionally responsible for a household, and may manage task allocation and incentivizing for household members (e.g., children). In other words, parents who may be cardholders may also have younger children that they are responsible for, which may include assigning tasks or chores to be completed around the house. In some cases where parents assign these tasks, they also provide some sort of incentive to get the children to perform the task. Incentivizing tasks assigned to household members using payment card reward points may reduce the costs and time associated with managing a household while increasing efficiency, through increased motivation and task awareness.

The TM computing device is configured to maintain task records associated with household members and virtual point values, such that the reward points become available after a task is completed. In one embodiment, virtual points may be allocated to a task record associated with a household member, where the virtual points indicate reward points associated with the cardholder. For example, virtual reward points may be allocated to a child based on a parent's reward points, such that the parent maintains control over the reward points. In other words, the reward points that are initially assigned to the parent for purchases made may be virtually assigned to a child for performing a task. However, these reward points remain assigned to the parent because the parent is the actual cardholder(s), but are virtually assigned within the system to the child. The child can only spend the reward points virtually assigned to them with the permission of the parent(s). In some embodiments, the TM computing device is further configured to provide a reward portal, such that household members can manage and redeem their virtual points. For example, the reward portal may include suggested products based on available points, in addition to an overview of assigned tasks.

The TM computing device is configured to receive task requests from a cardholder computing device, and to generate task records based on the task request. The task request includes a reward point value, a household member identifier, and a task description. In certain embodiments, where the task request further includes a date identifier, the TM computing device is configured to generate a reward portal view including a task calendar displaying tasks associated with a household member. The TM computing device is configured to receive task updates from the cardholder computing device, such as marking a task as completed and releasing the virtual points to the household member. In some embodiments, the TM computing device provides a reward portal for redeeming virtual points and/or reward points, including generating portal views including suggested products based on available virtual points.

To provide task management functionality, the TM computing device is configured to maintain task data in a database associated with the TM computing device. It does so in response to receiving the task requests and task updates from the cardholder computing device. In the example embodiment, task data includes task records, which represents tasks assigned to household members (e.g., children) by cardholders (e.g., parents, guardians). Task records include a household member identifier, a task description, a reward point value, etc. In certain embodiments, task records include a date identifier, representing a deadline and/or start date.

In some embodiments, where the TM computing device provides a reward portal, the task records further include a goal virtual point balance and a product identifier, representing a goal specification associated with a task. For example, a task request may include the product identifier of a bicycle as the incentive for the household member, and a goal virtual point value of 400 points based on the value of the bicycle.

The TM computing device is configured to retrieve household member data associated with a household member identifier, representing a user profile associated with any number of assigned tasks. In some embodiments, the TM computing device is configured to store and retrieve household member data from a database associated with the TM computing device. Additionally or alternatively, the TM computing device may be configured to retrieve household member data from a data source, such as a payment network profile database. Household member data includes household member profiles. Household member profiles include a household member identifier, a cardholder identifier, etc. In some embodiments, household member profiles further include a notification address such as a phone number, device ID associated with a smartphone, or an email address. In certain embodiments, household member profiles include product identifiers and/or product category identifiers, representing products and/or categories associated with the household member. In one embodiment, product categories are manually selected by the household member or associated cardholder during an enrollment process. Additionally or alternatively, product categories may be automatically determined by the TM computing device based on received view requests (e.g., requesting product information) and/or product identifiers included in task requests (e.g., task goal products). In some embodiments, the TM computing device maintains a record of product identifiers viewed by or associated with the household member.

The TM computing device is communicatively coupled to a provided reward filtering (RF) computing device. In some embodiments, the TM computing device is in communication with the RF computing device using a network (e.g., network 140), such as a payment network configured to process payment card transactions. In other embodiments, the TM computing device includes the RF computing device. The RF computing device is configured to store reward data and/or maintain a database of reward data. Reward data includes product records. Product records include a product identifier, a description, and a reward point value. In certain embodiments, product records include any number of product category identifiers. In one embodiment, reward data includes products available through a reward program, such as gift-cards or promotional items. For example, available rewards may include a zoo ticket or a music gift card may be stored as product records, including a redemption point value, a product identifier, and associated categories. The zoo ticket product record may include product categories associated with family-friendly activities, entertainment tickets, animals, and the like. The music gift card product record may include product category identifiers associated with technology, gift-cards, entertainment gift-cards, music, and the like.

Category identifiers include interest categories and demographic categories. Demographic categories may be associated with any combination of age, race, income, education, employment, and geographic data. Interest categories include, in one embodiment, identifiers associated with categories and/or types of products. For example, category data may include a category identifiers associated with children's construction toys. In another example, category data may include a category identifier associated with children's arts and crafts kits.

The TM computing device is in communication with a network, including an accountholder computing device, associated with an accountholder user, and a household member computing device, associated with a household user. In one embodiment, accountholder users may include parents, and household users may include children. In certain embodiments, the network is a payment processing network for processing payment card transactions.

In operation, the TM computing device is configured to receive a task request from a cardholder computing device, including a household member identifier, a virtual point value, and a task specification. A household member identifier uniquely identifies a household member and/or a household member computing device. The virtual point value indicates a value of virtual points associated with a particular task. In one embodiment, the virtual point value includes an amount of points available after the associated task has been completed, representing a reward and/or incentive for the task. In some embodiments, the virtual point value may include virtual points associated with reward points earned by a cardholder. For example, a parent (e.g., cardholder) may earn reward points by using a payment card, and the parent may create task requests associated with householder members (e.g., children) including the virtual points (backed by the reward points) as an incentive for completing the task. The task specification includes a human-readable instruction and/or description defined by the cardholder, such that the household member can interpret the task specification. For example, the task specification may include a text description, such as "vacuum the living room". Additionally or alternatively, the task specification may include an image, such as an image of a vacuum. In certain embodiments, the task specification includes a completion condition, defining a condition upon which the associated virtual point value is dependent. In one embodiment, the task specification includes a deadline and/or timeframe. For example, a task specification may include "wash the dog on Friday."

In certain embodiments, the task request may further include a task goal, such as a product identifier. In one embodiment, a cardholder may select a product to represent a reward associated with the task, such as a specific toy desired by a child household member. For example, a cardholder may select a product and the TM computing device may determine a virtual point or reward value based on the selected product. In some embodiments, the TM computing device stores the task goal in a task record associated with the task request. Additionally or alternatively, the TM computing device may store the task goal in a household member profile associated with the task request, such that multiple tasks, and associated virtual point values, may be associated with the task request. For example, multiple tasks may be required to accrue sufficient virtual points to accomplish the goal.

The TM computing device is configured to store a task record based on the household member identifier, including at least one task specification, a virtual point balance, and a conditional virtual point balance. For example, the TM computing device may store a database record indexed using a household member identifier including a virtual point balance, and the TM computing device may further store associated (e.g., including the household member identifier) database records including task specifications and conditional virtual point balances. Additionally or alternatively, the task record includes a task identifier uniquely identifying task a stored in the database. In one aspect, the TM computing device stores tasks and virtual point balances associated with the household member.

The TM computing device is configured to receive a task update, associated with a task specification, including a household member identifier. In one embodiment, the task update includes a task identifier such that the associated task is marked as competed, and the virtual point value is made available to the household member. For example, the TM computing device may update a virtual point balance in a household member profile associated with a household member identifier included in the task record. In another embodiment, the TM computing device is configured to receive task updates including replacement date identifiers, virtual point values, task descriptions, and the like, such that the cardholder can update and/or delete task records.

In some embodiments, the TM computing device is configured to generate and transmit notifications to household member computing devices and/or cardholder computing devices. In one embodiment, the TM computing device is configured to transmit a notification (e.g., SMS message) to a household member associated with a task having an upcoming task deadline. In another embodiment, the TM computing device is configured to transmit a notification (e.g., email) to a cardholder computing device based on a task with a recently passed task deadline, such that cardholders are reminded to update the status of assigned tasks. For example, the TM computing device may retrieve task records having a date identifier indicating a recently passed deadline, retrieve household member profiles including emails based on the task records, and finally generate email notifications based on the retrieved emails and task records. In certain embodiments, the TM computing device is configured to generate a point alert (e.g., notification) based on the received task update. In one embodiment, the TM computing device may notify a household member that a task has been marked as completed, and additional virtual points are available. For example, a household member may receive a notification indicating that due to their completion of a "vacuum" task, they have been allocated 50 virtual points by the TM computing device.

In certain embodiments, the TM computing device is configured to generate and transmit a goal alert (e.g., notification) based on a goal virtual point value included in a task request and a task update. In one embodiment, the TM computing device, in response to receiving a task update, determines if an increased virtual point balance included in a household member profile is sufficient compared to a goal virtual point balance. For example, after the TM computing device increases a 340 virtual point balance to 440 points based on a task update indicating a task has been completed, the TM computing may further determine that the increased virtual point balance exceeds a stored goal virtual point balance of 400 associated with a product identifier of a bicycle, and further transmit a goal alert (e.g., SMS, email) including the product identifier to the household member associated with the virtual point balance. As another example, a child may receive a notification that, due to a completed task, they have accumulated enough virtual points to redeem a goal including a bicycle.

The TM computing device is configured to update the stored household member profile, based on the received task update. In some embodiments, the TM is configured to retrieve task specifications based on the received task update, update the retrieved task specifications to indicate completion, and update a virtual point balance associated with the household member profile. For example, the TM computing device may update a field included in a database record associated with a task specification to indicate the task has been completed, and increase the virtual point balance associated with the household member profile by the conditional virtual point balance associated with the task specification.

The TM computing device is configured to receive a portal view request from a household member computing device, including a household member identifier. In some embodiments, the view request includes an API call such as a HTTP request. In one embodiment, the view request includes a HTTP request from a web browser associated with a household member computing device. In another embodiment, the view request includes an API call from a smartphone (e.g., household member computing device).

The TM computing device is configured to retrieve household member data based on the household member identifier included in the portal view request. In one embodiment, the TM computing device is configured to query a database using the household member identifier to retrieve household member data including insight data, such as demographic data, category data, and product history data. For example, the TM computing device may receive a view request associated with a specific product, and the TM computing device may further record an identifier of the specific product in the product history. In some embodiments, the TM computing device is configured to retrieve household data including product identifiers and/or product categories. In one embodiment, the TM computing device retrieves a task goal associated with the household member. In another embodiment, the TM computing device retrieves any number of product categories associated with the household member, such as categories specified by the cardholder. In yet another embodiment, where the TM computing device provides a reward portal, the TM computing device is configured to determine product categories and/or identifiers based on reward portal interactions (e.g., product views, product searches).

The TM computing device is configured to transmit household member data to the reward filtering (RF) computing device. In one embodiment, the TM computing device is configured to query the RF computing device with a household member identifier and any number of category identifiers, such that the query returns product data. In another embodiment, the TM computing device makes a HTTP API call to the RF computing device, such that the RF computing device response with an XML file including product identifiers.

The RF computing device is configured to filter product data, including product identifiers and product category identifiers, based on the household member data. In one embodiment, the RF computing device stores product data, including product identifiers and product category identifiers. Additionally or alternatively, the RF computing device is in communication with a database storing product data including product identifiers and product category identifiers. In some embodiment, the RF computing device filters stored product data based on product category identifiers included in the household member data. For example, the RF computing device may return the identifiers of products associated with product categories identified in the household member data. Additionally or alternatively, the RF computing device may return the identifiers of products associated with the demographic data included in the household member data. For example, the RF computing device may the identifiers of products appropriate for an 11 year old female.

The RF computing device is configured to transmit filtered product identifiers to the task profile computing device, such as an XML or JSON response to an API call, or as a SQL query response.

The TM computing device is configured to generate a filtered portal view based on the task profile and received product identifiers, including a task calendar, reward and/or virtual point visualization (e.g., virtual point graphic display), and at least one suggested product. As used herein, filtered portal view refers to a data structure configured to be rendered by a client application (e.g., viewer application) on a household member computing device. In one embodiment, the filtered portal view includes a HTML file rendered by a web browser included in a household member computing device. In another embodiment, the filtered portal view includes an XML or JSON file rendered by a client application on a household member computing device such as a smartphone.

In some embodiments, the TM computing device is configured to generate the filtered portal view by combining a view template with data including household member data, category data, product history data, product data, task profile data, and the like. In one embodiment, the TM computing device is configured to generate a filter portal view including a list of products by combining product identifiers with a HTML based template including template parameters corresponding to product identifiers.

The TM computing device is configured to transmit the filtered portal view to the household member computing device, such as a response to a HTTP request, or a response to an API call. For example, the filtered portal view may include an XML data structure, or a HTML webpage.

In some embodiments, the household member computing device is configured to render the filtered portal view as a webpage. For example, the household member computing device may render a received HTML file as an interactive webpage including a task calendar and a plurality of suggested products. In another embodiment, where the household member computing device is a mobile device including an application associated with task management, the application may render a received JSON file as a mobile app view including a task calendar and any number of suggested products.

In certain embodiments, the TM computing device is further configured to store a cardholder profile, including a cardholder reward point balance and a conditional reward point balance. In one embodiment, the cardholder reward point balance includes an actual amount of reward points currently available to, and earned by, the cardholder. Conditional reward point balance refers to a reward point balance adjusted based on task records and household member profiles. In one embodiment, the conditional reward point balance may include the cardholder reward point balance adjusted by reward points values associated with household member profiles and task records. For example, a cardholder may have a balance of 500 reward points and also allocate 100 reward points to household members, leading to a conditional reward point balance of 400. In some embodiments, the TM computing device is configured to maintain a database of cardholder profiles. Additionally or alternatively, the TM computing device is configured to store cardholder profiles in the household member data. In alternate embodiments, the TM computing device is configured to retrieve cardholder profiles based on a cardholder identifier. For example, the TM computing device may retrieve a cardholder profile from a payment network processing payment card transactions.

In some embodiments, the TM computing device is configured to receive and process redemption requests. In one embodiment, the TM computing device receives a redemption request including a redeemed point value, a cardholder identifier, and a household member identifier. For example, a redemption request may indicate a value of points used to redeem a reward by a household member using reward points associated with a cardholder. The TM computing device is configured to update household member profiles and/or cardholder profiles based on redemption requests. In one embodiment, the TM computing device is configured to decrease a virtual point balance associated with the household member, and decrease a cardholder reward point balance associated with the cardholder. For example, the TM computing device may record the updated balance of reward points associated with the cardholder, and may update the balance of virtual points assigned to the household member. In certain embodiments, the TM computing device is configured to update the cardholder reward point balance based on redemption requests (e.g., purchases, orders), and update the conditional reward point balance based on task requests (e.g., assignment of new tasks).

In certain embodiments, the TM computing device is configured to require at least one of (a) approval of redemption requests by an associated cardholder, and (b) preapproval of redemption requests based on product identifiers included in the household member profile, such as goal products. In one embodiment, where the TM computing device is configured to receive redemption requests, the TM computing device is further configured to determine if the redemption request includes a preapproved product identifier. For example, the TM computing device may determine the product identifier was previously included in a task request as a goal product, indicating preapproval from the cardholder. Additionally or alternatively, the TM computing device is configured to determine the product identifier is not preapproved, and further to generate an approval request. In one embodiment, the TM computing device may transmit an alert to a cardholder device indicating the product the household member wants to redeem, and further including an option to approve or decline the redemption request. In one embodiment, the approval request includes a HTTP URL associated with the TM computing device, wherein the URL is configured to indicate the redemption request has been approved. For example, a task request may include a product identifier indicating a goal product of a bicycle, if the redemption request includes a product identifier associated with a skateboard, the TM computing device may transmit an approval request to the parent (e.g., cardholder).

In certain embodiments, the TM computing device is configured to determine if a product identifier included in a redemption request is preapproved based on the associated household member profile, and transmit an approval request to a cardholder computing device, where the approval request includes the product identifier and an option to approve the associated redemption request. In one embodiment, the approval request is configured to display the product on the cardholder computing device based on the product identifier, and present an option to approve the redemption request.

The systems and methods described herein are configured to facilitate (a) tracking incentives associated with assigned tasks using virtual points; (b) automatically transferring virtual points based on task completion; (c) managing tasks associated with multiple household members; (d) generating relevant task incentives based on household member data; (e) providing an interactive interface for tracking assigned tasks and associated incentives; and (f) automatically incentivizing assigned tasks using virtual points and reward points.

Described herein are computer systems such as a host computing device, network access computing devices, and an NM computing system. As described herein, all such computer systems include at least one processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In various embodiments, task management data (e.g., task requests, task updates, redemption requests) and/or historical transaction data of certain users is anonymized and/or aggregated prior to receipt by the transaction analysis computing device (e.g., in some cases, no personally identifiable information (PII) is received by the transaction analysis computing device). In other embodiments, the task management computing device may be configured to receive task management data that is not yet anonymized and/or aggregated; however, the task management computing device and may be configured to anonymize and/or aggregate the task management data. In such embodiments, any PII received by the transaction analysis computing device may be received and processed in an encrypted format, or may be received with the consent of users with which the PII is associated. In other words, users may be prompted, prior to collection and/or analysis of task management transaction data, to opt-in or request participation in the processes implemented by the systems and methods described herein. In situations in which the systems discussed herein collect PII about individuals including users and/or merchants, users may be provided with an opportunity to control whether such information is collected or to control whether and/or how such information is used. In addition, certain data may be processed in one or more ways before it is stored or used, so that personally identifiable information is removed or anonymized.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to route data packets in a distributed network system.

FIG. 1 is a schematic diagram illustrating an example task management system 100, including task management computing device 150. TM computing device 150 is communicatively coupled to reward database 160, such that TM computing device 150 can retrieve task data 162 and household member data 164 from the database using database queries. Task management computing device 150 includes a database server 150 configured to operate database 160. In one embodiment, Database 160 stores a task table and a household member table, and responds to queries received from task management computing device 150 and/or database server 153. For example, the TM computing device may retrieve task records associated with a household member by querying the database with a household member identifier. Database queries include SQL queries, API calls, and the like. TM computing device 150 is also communicatively coupled to reward filtering (RF) computing device 152, where the filtering computing device 152 stores product data 152. In some embodiments, TM computing device 150 is configured to retrieve product data 154 from RF computing device 152 using a product category. For example, RF computing device 152 may return product data including product identifiers associated with a product category. In certain embodiments, reward filtering computing device 152 may be a component of task management computing device 150.

Task management computing device 150 is connected to network 140. In some embodiments, network 140 is a payment network associated with processing payment card transactions. Additionally or alternatively, network 140 may be a virtual network accessible over the internet. Network 140 includes cardholder computing device 170 and household member computing device 180. In certain embodiments, TM computing device 150 is configured to transmit notifications to user devices including cardholder computing device 170 and household member computing device 180, such as SMS messages, emails, and the like. In some embodiments, where TM computing device 150 is configured to provide a reward portal, TM computing device is further configures to receive view requests, and transmit view responses to user devices including cardholder computing device 170 and household member computing device 180, such as JSON responses to API calls, and HTTP responses including HTML webpages. For example, household member computing device 180 may transmit a HTTP request for a webpage, and the TM computing device 150 may transmit a HTTP response including a HTML webpage representing a view of the reward portal using network 140. Cardholder computing device 170 and household member computing device 180 may include smartphones, tablets, personal computers, and the like.

Figure 2:
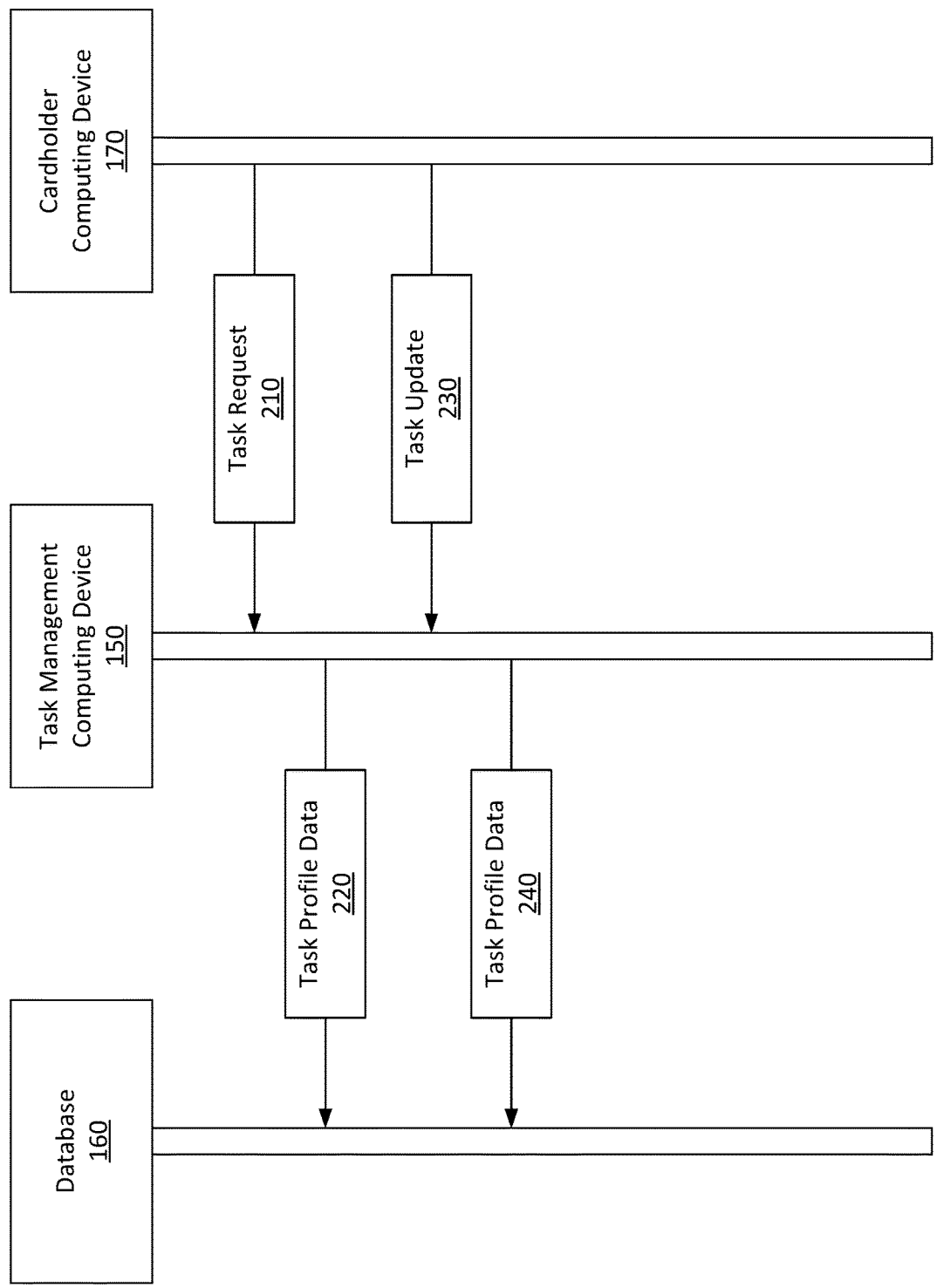

FIG. 2 is a data flow diagram of the task management system 100 (shown in FIG. 1). TM computing device 150 receives a task request 210 from a cardholder computing device 170. Task request 210 includes, at least, a household member identifier, a virtual point value, and a task description, representing a task assigned to a household member. In some embodiments, task request 210 further includes a date identifier, such as a task deadline. For example, a task request may be associated with a cardholder parent, and the task request may be associated with a dependent child, further including a description of a household task. In certain embodiments, task request 210 includes a product identifier, such as a goal product.

TM computing device 150 is configured to store task profile data 220 in database 160, based at least in part on the task request 210. For example, TM computing device 150 may store a task record in database 160 based on task request 210. In one embodiment, the TM computing device 150 generates an SQL query based on task request 210, wherein the query includes instructions to store a new record in database 160, associated with the cardholder and household member, and the record including the task description and virtual point value. For example, a task record may include a task identifier determined by database 160, household member identifier from task request 210, and a cardholder identifier determined by TM computing device 150. TM computing device 150 is configured to store task data such that task records may be retrieved using any combination of household member identifiers, cardholder identifiers, date identifier and the like. For example, TM computing device 150 may retrieve task records based on date ranges, such as expired tasks.

TM computing device 150 is further configured to receive a task update 230 from the cardholder computing device 170. In one embodiment, task update 230 is associated with a task, and includes a flag to mark the associated task as completed and release the associated virtual points. For example, task update 230 may be generated after an associated cardholder determines a previously requested task has been completed. In another embodiment, task update 230 includes instructions to update and/or delete an associated task. For example, task update 230 may include instructions to update the date identifier (e.g., deadline) associated with a task.

In certain embodiments, where TM computing device 150 is configured to transmit notifications to cardholder computing device 170 based on stored task data, task update 230 is in response to a cardholder notification. For example, TM computing device 150 may transmit a notification to cardholder computing device 170 including a task record having a recently passed deadline, and task update 230 may include marking the task record as completed.

TM computing device 150 is configured to store updated task profile data 240 in database 160, based on the task update 230. For example, TM computing device 150 may generate a SQL query including a task identifier, and a flag to mark the task as completed. TM computing device 150 is further configured to update associated virtual point values and balances. In certain embodiments, TM computing device 150 is configured to increase a virtual point balance stored in a household member profile associated with the task record based on a virtual point value included in the task record. Additionally or alternatively, TM computing device 150 is configured to decrease a reward point balance associated with the cardholder, based on the virtual point value included in the task record.

Figure 3:
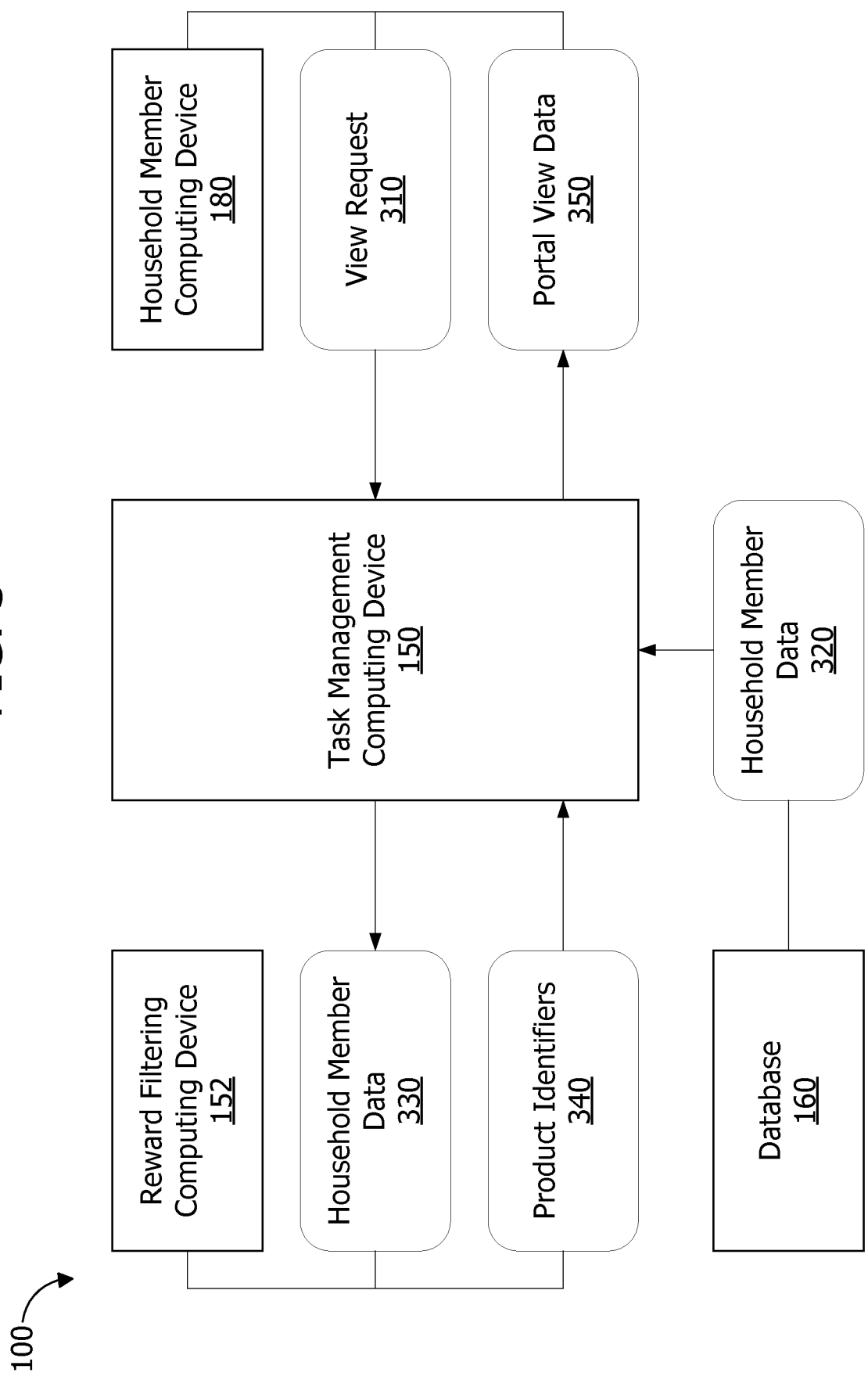

FIG. 3 is a data flow diagram of the task management system 100 (shown in FIG. 1). TM computing device 150 receives a view request 310 from household member computing device 180, including at least household member identifier. In some embodiments, the view request includes a HTTP or HTTPS request for a HTML webpage, and may be generated by a web browsing application included on household member computing device 180. In other embodiments, where household member computing device 180 is a mobile device such as a smartphone, the view request may be transmitted by a reward application, such as an API call.

TM computing device is configured to retrieve household member data 320 from database 160 based at least in part on the view request 310, including the household member identifier. Household member data includes any number of product identifiers and product categories. In one embodiment, household member data includes a product goal associated with a household member. In another embodiment, household member data includes categories associated with the household member, such as interest categories or demographic categories. For example, household member data may include a goal product identifier, a demographic category identifier indicating products for children between 11 and 13, and an interest category identifier associated with educational products. Additionally or alternatively, household member data may include any number of task records associated with the household member identifier included in the view request. In certain embodiments, household member data includes task descriptions, reward point values, and date identifiers (e.g., deadlines).

TM computing device is further configured to transmit household member data 330 to the RF computing device, including at least a household member identifier and product identifiers/categories. The RF computing device 152 is configured to, in response to receiving household member data 330, filter product data 154 (shown in FIG. 1) based on household member data 330, and transmit product data 340 to TM computing device 150 based on the filtering. Product data 340 includes at least one product identifier. In one embodiment, product data 340 includes product identifiers, product descriptions, product images, and associated reward point values (e.g., redemption costs). In one embodiment, RF computing device 152 is configured to filter product data based on product categories associated with category identifiers. For example, RF computing device 152 may determine any number of product identifiers associated with a demographic category (e.g., children aged 10-13) included in household member data 330, such as filtering product data to products identifiers appropriate and safe for the age group indicated by the category identifier. In another example, RF computing device 152 may determine any number of product identifiers associated with an interest category (e.g., zoo animals) included in household member data 330, such as filtering product data to product identifiers associated with animal related products. In certain embodiments, RF computing device 152 is configured to determine any number of product identifiers associated with a product identifier stored in household member data 330, such as a goal product or previously viewed product. In one embodiment, RF computing device 152 may determine a category identifier associated with the product, and filter based on the determined category identifier to retrieve products associated with the goal product. In some embodiments, RF computing device 152 may filter based on any combination of product identifiers and product categories.

TM computing device 150 is configured to generate and transmit a portal view data 350 to household member computing device 180, based on household member data 320 and product data 340. In one embodiment, portal view data 350 includes multiple product descriptions based on product data 340, such as a grid or list of products associated with virtual points retrieved from the RF computing device 152. For example, portal view data 350 may include multiple suggested products available based on earned virtual points as an incentive to the household member. In another embodiment, portal view data 350 includes a task calendar displaying multiple tasks based on associated date identifiers included in the household member data 320. For example, portal view data 350 may include a calendar of task deadlines. In yet another embodiment, portal view data 350 includes a graphic display of a virtual point balance included in household member data 320. For example, a chart may illustrate the virtual point balance associated with the household member over time. In some embodiments, portal view data 350 includes any combination of task calendars, product descriptions, and virtual point graphic displays.

In certain embodiments, TM computing device 150 is configured to generate portal view data 350 based on a template, such as a HTML template. In one embodiment, TM computing device 150 is configured to match household member data 320 and product data 340 with data fields in a HTML template to generate portal view data 350 including a HTML webpage. In other embodiments, TM computing device 150 is configured to encode member data 320 and product data 340 as a data structure such as an XML or JSON file, representing an API response. For example, TM computing device 150 may generate a JSON file configured to be displayed by a mobile device application included on a device such as household member computing device 180. For example, the mobile device application may be configured to generate a user interface to represent the data included in the portal view data 350. The TM computing device is configured to transmit portal view data 350 to household member computing device 180 using a network, such as network 140 (shown in FIG. 1). For example, TM computing device may transmit a HTTP message to household member computing device 180.

Figure 4:
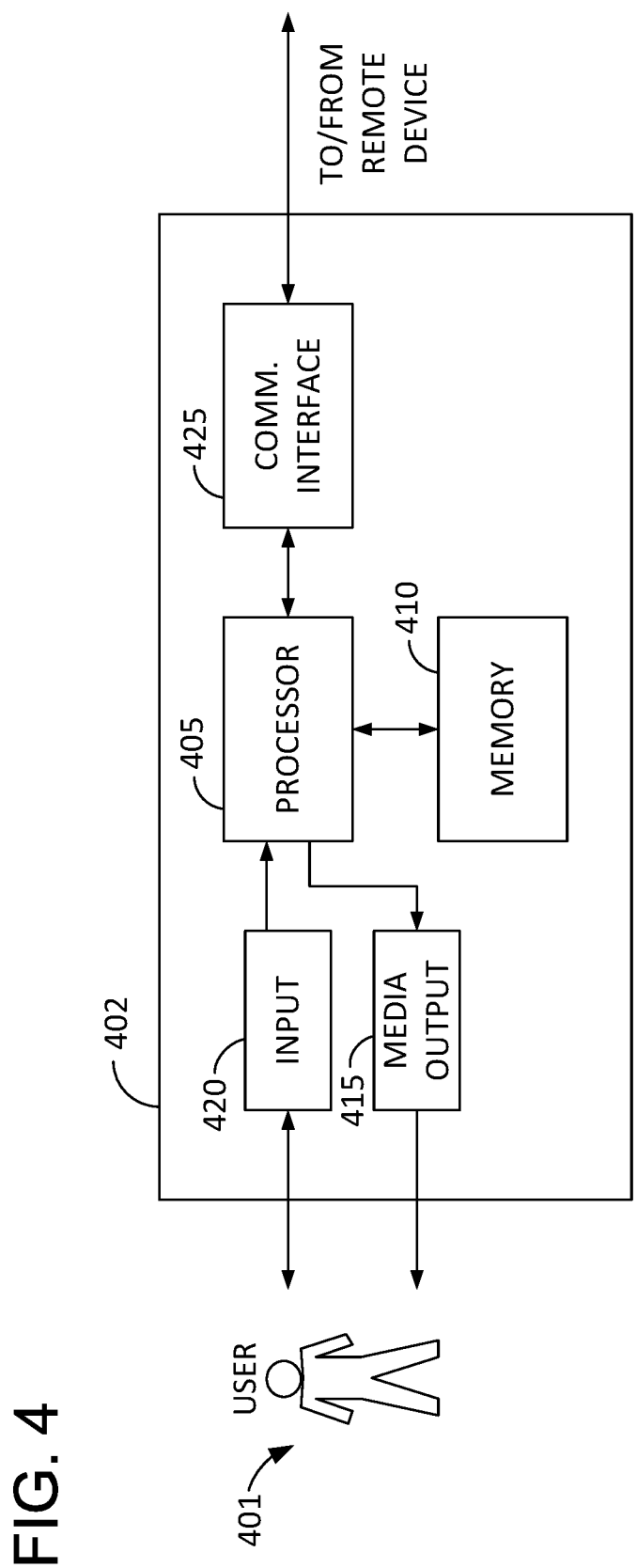

FIG. 4 depicts an exemplary configuration of a remote or user computing device 402, such as cardholder computing device 170 and household member computing device 180 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 40. A user interface may include, among other possibilities, a web browser and client application. Web browsers enable users 401 to display and interact with media and other information typically embedded on a web page or a website from a web server. A client application allows users 401 to interact with a server application associated with, for example, a vendor or business.

Figure 5:
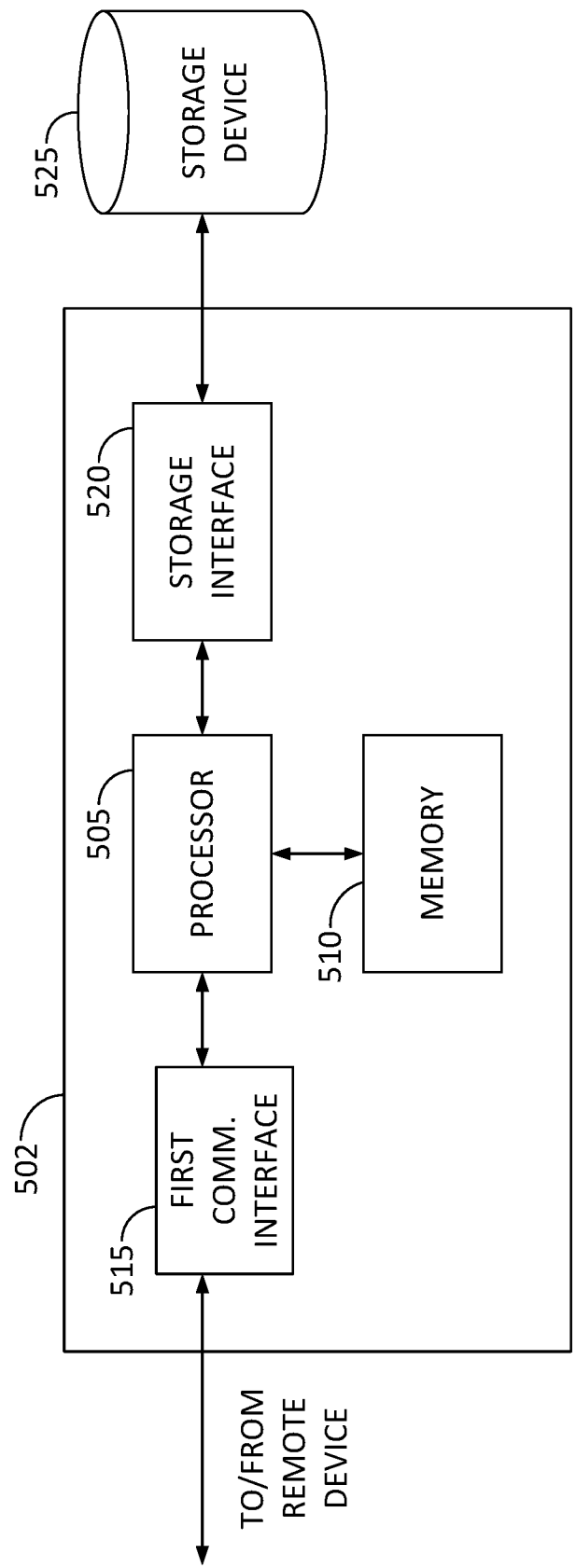

FIG. 5 depicts an exemplary configuration of a host computing device 502, such as TM computing device 150 (shown in FIG. 1), and in some embodiments, RF computing device 152. Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as cardholder computing device 170 and household member computing device 180. For example, communication interface 515 may receive view requests from household member computing device 180 via network 140 (both shown in FIG. 1).

Processor 505 may also be operatively coupled to a storage device 525 (e.g., database 160, shown in FIG. 1).

Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 534.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
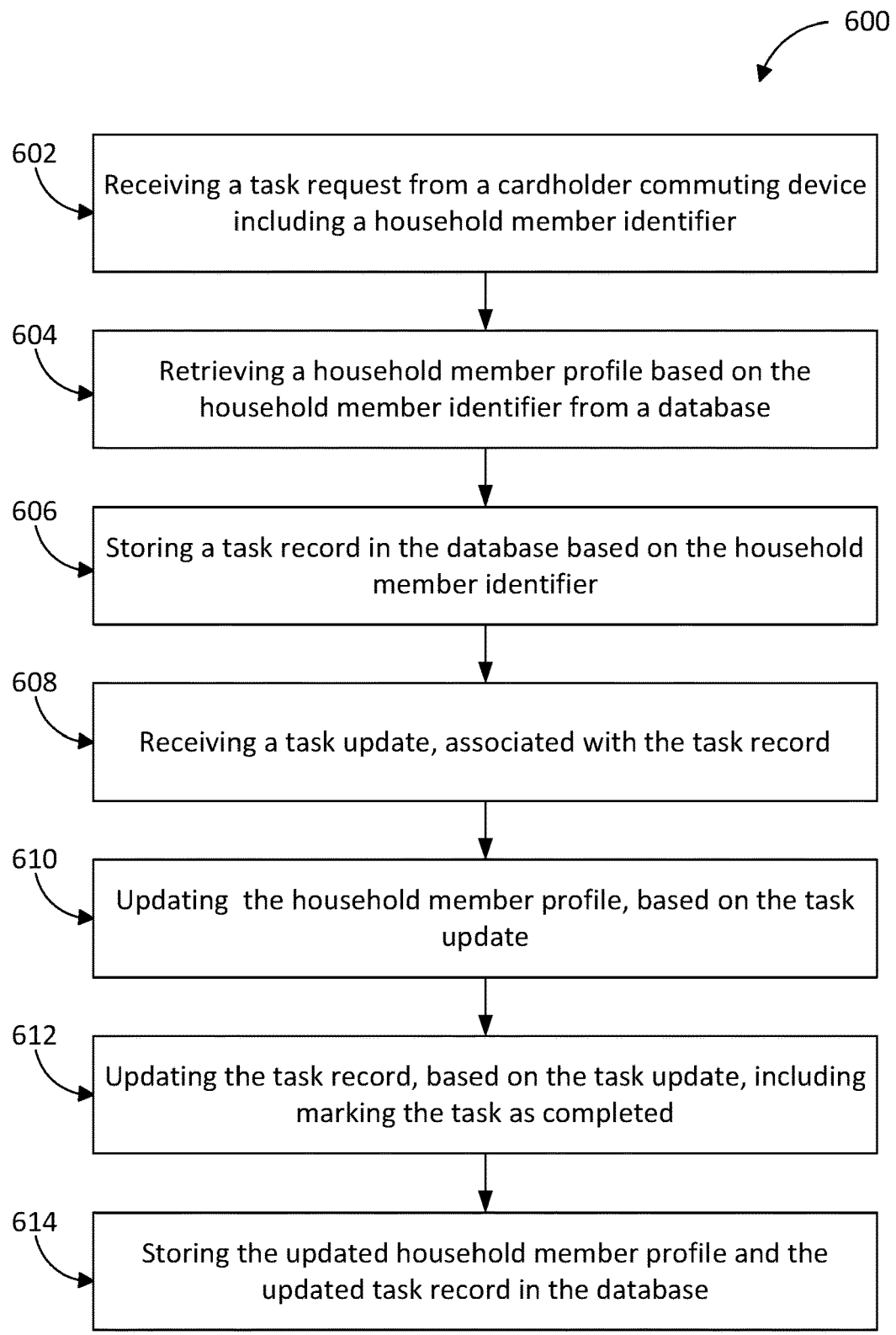

FIG. 6 is a flow diagram of an example method 600 for tracking task assignments and associated incentives using TM computing device 150 (as shown in FIG. 1). In the example embodiment, method 600 is performed by a TM computing device. In certain embodiments, method 600 may be at least partially performed by a different computing device. In other embodiments, method 600 may include additional, fewer, or alternate actions, including those described elsewhere herein.

Method 600 includes TR computing device 150 receiving 602 a task request from a cardholder commuting device including a household member identifier, retrieving 604 a household member profile based on the household member identifier from a database, storing 606 a task record in the database based on the household member identifier, receiving 608 a task update, associated with the task record, updating 610 the household member profile, based on the task update, updating 612 the task record, based on the task update, including marking the task as completed, and storing 614 the updated household member profile and the updated task record in the database.

Figure 7:
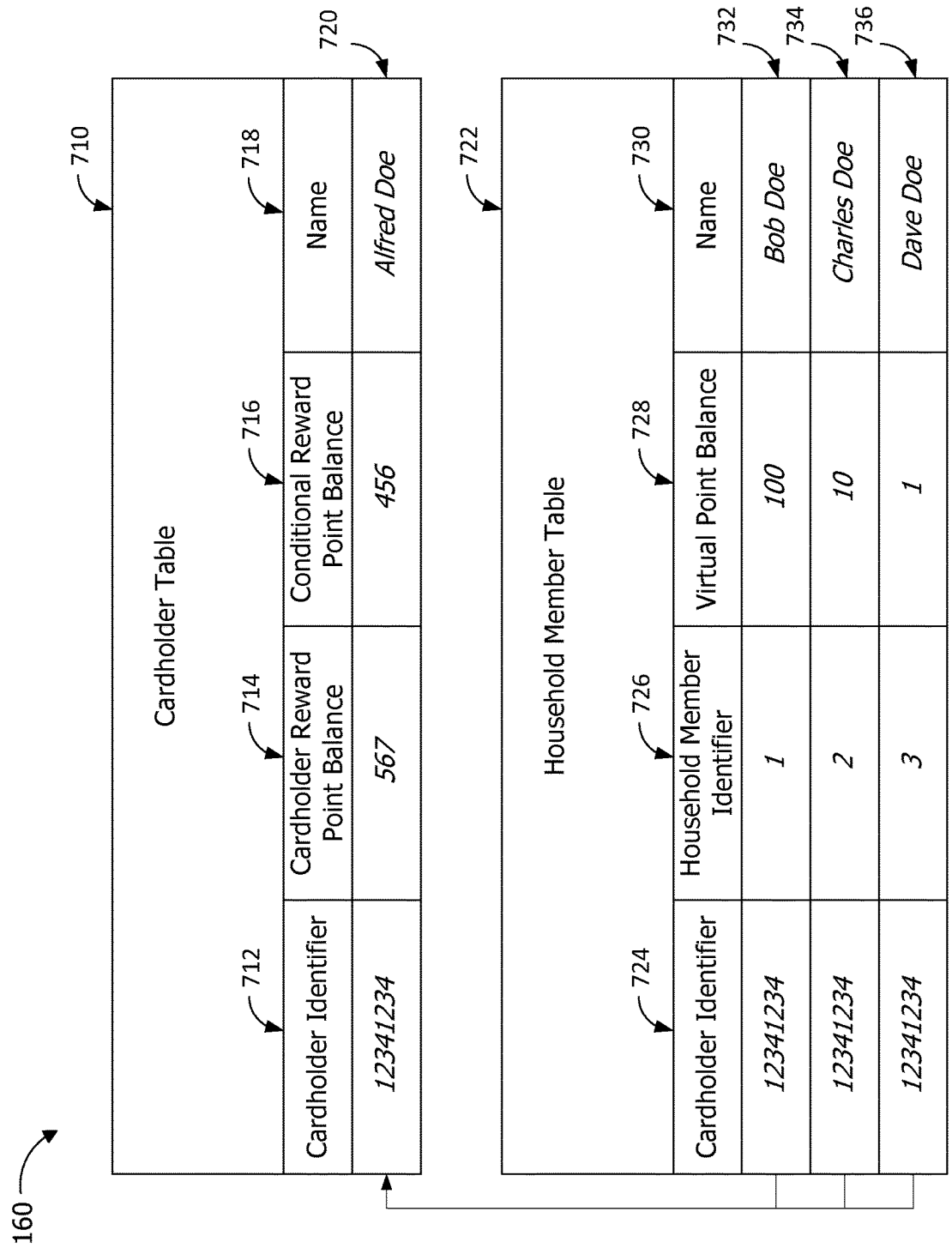

FIG. 7 depicts an exemplary configuration of database 160 (shown in FIG. 1) where TM computing device 150 is configured to store cardholder profile data and household member profile data. Database 160 includes Cardholder Table 710, storing cardholder profile data, and household member table 722, storing household member profile data. Cardholder table 710 includes fields (e.g., columns, values) such as cardholder identifier 712, cardholder reward point balance 714, conditional reward point balance 716, and name 718. Record 720 includes values for data fields such as 712, 714, 716, and 718. For example, Record 720 includes a value for name data field 718 of "Alfred Doe". Record 720 further includes cardholder identifier "12341234", cardholder reward point balance "567", and conditional reward point balance "456". In certain embodiments, cardholder identifier 712 uniquely identifies (e.g., indexes) records in cardholder table 710.

Household member table 722 includes fields such as cardholder identifier 724, household member identifier 726, virtual point balance 728, and name 730. Records 732, 734, and 736 each include values for fields including 724, 726, 728, and 730. For example, record 732 includes a name of "Bob Doe", a cardholder identifier of "12341234", a household member identifier of "1", and a virtual point balance of "100". Cardholder identifier 724 refers to cardholder identifier 712 such that records in household member table 722 are associated with records in cardholder table 710. For example, child records in table 722 may be associated with parent records in table 710. In certain embodiments, cardholder identifier 724 in combination with household member identifier 726 uniquely identifies records in household member table 722. Additionally or alternatively, household member identifier 726 may uniquely identify records in table 722.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A task management computing device comprising at least one processor in communication with at least one memory device, said task management computing device configured to:

receive a task request, from a cardholder computing device via Internet communication, the task request including a household member identifier, a virtual point value, and a task description;

store, in a database in response to the task request, a task record associated with the household member identifier, the task record including the task description and the virtual point value;

receive a task update associated with the task record from the cardholder computing device via Internet communication, the task update including the household member identifier and indicating that the task has been completed;

update, in response to the indication of completion of the task, a household member profile stored in the database based on the task update, including increasing a virtual point balance by the virtual point value included in the task record, wherein the household member profile is uniquely identified by the household member identifier and includes one or more product category identifiers;

update the task record stored in the database, based on the task update, including recording the task as completed;

receive via Internet communication a portal view request from a household member computing device different from the cardholder computing device, the portal view request including the household member identifier, wherein the portal view request is one of i) a HTTP or HTTPS request for a HTML webpage generated by a web browsing application executing on the household member computing device, and ii) an API call generated by a client application executing on a mobile computing device comprising the household member computing device;

retrieve, in response to the portal view request, from the household member profile uniquely identified by the household member identifier, one or more product category identifiers associated with the household member identifier;

generate a filtered portal view including i) a task calendar including tasks associated in the database with the household member identifier, ii) a graphic display of the increased virtual point balance associated in the database with the household member identifier, and iii) one or more reward products corresponding to the one or more product category identifiers, wherein the filtered portal view is a data structure comprising one of:

i) in response to the portal view request being the HTTP or HTTPS request, a HTML file configured to be rendered by the web browser application executing on the household member computing device, and ii) in response to the portal view request being the API call from the client application, an XML or JSON file configured to be rendered by the client application executing on the household member computing device;

transmit the filtered portal view via Internet communication to the household member computing device;

receive, from the household member computing device via Internet communication, a virtual point redemption request including a cardholder identifier, the household member identifier, and a product identifier, wherein the product identifier uniquely identifies a reward product from the one or more reward products included in the filtered portal view, the reward product valued at or below a reward point value equal to the increased virtual point balance; and transmit an approval request to the cardholder computing device via Internet communication, the approval request including the householder member identifier and computer executable instructions for executing a product order for the reward product in the cardholder's rewards program.

2. The task management computing device of claim 1, wherein the task request further includes a goal specification assigned to a household member, and wherein the goal specification includes a goal product identifier and a goal virtual point balance.

3. The task management computing device of claim 2 further configured to:
determine that the increased virtual point balance included in the updated household member profile meets or exceeds the goal virtual point balance;
generate a goal alert including computer operable instructions for (i) generating a product order based on the goal product identifier and the household member profile, and (ii) prompting a user to confirm the product order; and
transmit the goal alert to the cardholder computing device, the cardholder computing device configured to execute the computer operable instructions included in the goal alert.

4. The task management computing device of claim 1 further configured to:
retrieve the household member profile based on the household member identifier from the database, the household member profile including the virtual point balance, wherein the virtual point balance indicates a number of reward points assigned to the household member within the task management computing device.

5. The task management computing device of claim 1 further configured to:
receive a portal view request from the household member computing device, including the household member identifier;
generate a filtered portal view based on the updated household member profile including a task calendar and a virtual point graphic display; and
transmit the filtered portal view to the household member computing device for display on the household member computing device.

6. The task management computing device of claim 5 wherein the filtered portal view further includes at least one product identifier based on the household member profile.

7. The task management computing device of claim 1 further configured to:
transmit a point alert to previously presented household member computing device including the increased virtual point balance from the updated household member profile.

8. A completer-implemented method of assigning and tracking tasks using a task management (TM) computing device, wherein the TM computing device includes at least one processor and is in communication with a memory device, said method comprising:
receiving a task request, from a cardholder computing device via Internet communication, the task request including a household member identifier, a virtual point value, and a task description;
storing, in a database in response to the task request, a task record associated with the household member identifier, the task record including the task description and the virtual point value;
receiving a task update associated with the task record from the cardholder computing device via Internet communication, the task update including the household member identifier and indicating that the task has been completed;
updating, in response to the indication of completion of the task, a household member profile stored in the database based on the task update including increasing a virtual point balance by the virtual point value included in the task record, wherein the household member profile is uniquely identified by the household member identifier and includes one or more product category identifiers;
updating the task record stored in the database, based on the task update, including recording the task as completed;
receiving via Internet communication a portal view request from a household member computing device different from the cardholder computing device, the portal view request including the household member identifier, wherein the portal view request is one of i) a HTTP or HTTPS request for a HTML webpage generated by a web browsing application executing on the household member computing device, and ii) an API call generated by a client application executing on a mobile computing device comprising the household member computing device;
retrieving, in response to the portal view request, from the household member profile uniquely identified by the household member identifier, one or more product category identifiers associated with the household member identifier;
generating a filtered portal view including i) a task calendar including tasks associated in the database with the household member identifier, ii) a graphic display of the increased virtual point balance associated in the database with the household member identifier, and iii) one or more reward products corresponding to the one or more product category identifiers, wherein the filtered portal view is a data structure comprising one of:
i) in response to the portal view request being the HTTP or HTTPS request, a HTML file configured to be rendered by the web browser application executing on the household member computing device, and
ii) in response to the portal view request being the API call from the client application, an XML or JSON file configured to be rendered by the client application executing on the household member computing device;
transmitting the filtered portal view via Internet communication to the household member computing device;
receiving, from the household member computing device via Internet communication, a virtual point redemption request including a cardholder identifier, the household member identifier, and a product identifier, wherein the product identifier uniquely identifies a reward product from the one or more reward products included in the filtered portal view, the reward product valued at or below a reward point value equal to the increased virtual point balance; and
transmitting an approval request to the cardholder computing device, the approval request including the householder member identifier and computer executable instructions for executing a product order for the reward product in the cardholder's rewards program.

9. The method of claim 8, wherein the task request further includes a goal specification assigned to a household member, and wherein the goal specification includes a goal product identifier and a goal virtual point balance.

10. The method of claim 9 further comprising:
determining that the increased virtual point balance included in the updated household member profile meets or exceeds the goal virtual point balance;
generating a goal alert including computer operable instructions for (i) generating a product order based on the goal product identifier and the household member profile, and (ii) prompting a user to confirm the product order; and
transmitting the goal alert to the cardholder computing device, the cardholder computing device configured to execute the computer operable instructions included in the goal alert.

11. The method of claim 8 further comprising:
retrieving the household member profile based on the household member identifier from the database, the household member profile including the virtual point balance, wherein the virtual point balance indicates a number of reward points assigned to the household member within the task management computing device.

12. The method of claim 8 further comprising:
receiving a portal view request from the household member computing device, including the household member identifier;
generating a filtered portal view based on the updated household member profile including a task calendar and a virtual point graphic display; and
transmitting the filtered portal view to the household member computing device for display on the household member computing device.

13. The method of claim 12 wherein the filtered portal view further includes at least one product identifier based on the household member profile.

14. The method of claim 8 further comprising:
transmitting a point alert to the household member computing device including the increased virtual point balance from the updated household member profile.

15. One or more non-transitory computer-readable storage media having computer-executable instructions embodied thereon for assigning and tracking tasks, wherein when executed by at least one processor in communication with at least one memory, the computer-executable instructions cause the processor to:
receive a task request, from a cardholder computing device via Internet communication, the task request including a household member identifier, a virtual point value, and a task description;
store, in a database in response to the task request, a task record associated with the household member identifier, the task record including the task description and the virtual point value;
receive a task update associated with the task record from the cardholder computing device via Internet communication, the task update including the household member identifier and indicating that the task has been completed;
update, in response to the indication of completion of the task, a household member profile stored in the database based on the task update, including increasing a virtual point balance by the virtual point value included in the task record, wherein the household member profile is uniquely identified by the household member identifier and includes one or more product category identifiers;
update the task record stored in the database, based on the task update, including recording the task as completed;
receive via Internet communication a portal view request from a household member computing device different from the cardholder computing device, the portal view request including the household member identifier, wherein the portal view request is one of i) a HTTP or HTTPS request for a HTML webpage generated by a web browsing application executing on the household member computing device, and ii) an API call generated by a client application executing on a mobile computing device comprising the household member computing device;
retrieve, in response to the portal view request, from the household member profile uniquely identified by the household member identifier, one or more product category identifiers associated with the household member identifier;
generate a filtered portal view including i) a task calendar including tasks associated in the database with the household member identifier, ii) a graphic display of the increased virtual point balance associated in the database with the household member identifier, and iii) one or more reward products corresponding to the one or more product category identifiers, wherein the filtered portal view is a data structure comprising one of:
i) in response to the portal view request being the HTTP or HTTPS request, a HTML file configured to be rendered by the web browser application executing on the household member computing device, and
ii) in response to the portal view request being the API call from the client application, an XML or JSON file configured to be rendered by the client application executing on the household member computing device;
transmit the filtered portal view via Internet communication to the household member computing device;
receive, from the household member computing device via Internet communication, a virtual point redemption request including a cardholder identifier, the household member identifier, and a product identifier, wherein the product identifier uniquely identifies a reward product from the one or more reward products included in the filtered portal view, the reward product valued at or below a reward point value equal to the increased virtual point balance; and
transmit an approval request to the cardholder computing device via Internet communication, the approval request including the householder member identifier and computer executable instructions for executing a product order for the reward product in the cardholder's rewards program.

16. The non-transitory computer-readable storage media of claim 15, wherein the task request further includes a goal specification assigned to a household member, and wherein the goal specification includes a goal product identifier and a goal virtual point balance.

17. The non-transitory computer-readable storage media of claim 16, wherein the computer-executable instructions further cause the processor to:
determine that the increased virtual point balance included in the updated household member profile meets or exceeds the goal virtual point balance;
generate a goal alert including computer operable instructions for (i) generating a product order based on the goal product identifier and the household member profile, and (ii) prompting a user to confirm the product order; and transmit the goal alert to the cardholder computing device, the cardholder computing device configured to execute the computer operable instructions included in the goal alert.

18. The non-transitory computer-readable storage media of claim 15, wherein the computer-executable instructions further cause the processor to:

retrieve the household member profile based on the household member identifier from the database, the household member profile including the virtual point balance, wherein the virtual point balance indicates a number of reward points assigned to the household member and stored in the memory.

19. The non-transitory computer-readable storage media of claim 15, wherein the computer-executable instructions further cause the processor to:

receive a portal view request from the household member computing device, including the household member identifier;

generate a filtered portal view based on the updated household member profile including a task calendar and a virtual point graphic display; and transmit the filtered portal view to the household member computing device for display on the household member computing device.

20. The non-transitory computer-readable storage media of claim 19 wherein the filtered portal view further includes at least one product identifier based on the household member profile.

21. The non-transitory computer-readable storage media of claim 15, wherein the computer-executable instructions further cause the processor to:

transmit a point alert to the household member computing device including the increased virtual point balance from the updated household member profile.

* * * * *